(12) United States Patent  
Leong et al.

(10) Patent No.: US 9,130,947 B2  
(45) Date of Patent: *Sep. 8, 2015

(54) DATA EXCHANGE MANAGEMENT SYSTEM AND METHOD

(71) Applicant: JPMorgan Chase Bank, N.A., New York, NY (US)

(72) Inventors: Sang F. Leong, Matawan, NJ (US); Jae Sun Lee, Englewood Cliffs, NJ (US); Bill Telkowski, Lincoln University, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/868,328

(22) Filed: Apr. 23, 2013

(65) Prior Publication Data

US 2013/0290328 A1    Oct. 31, 2013

Related U.S. Application Data

(63) Continuation of application No. 12/178,065, filed on Jul. 23, 2008, now Pat. No. 8,554,932, and a continuation of application No. 11/028,061, filed on Jan. 4, 2005, now Pat. No. 8,255,568, and a (Continued)

(51) Int. Cl.
*G06F 15/16*        (2006.01)
*H04L 29/08*        (2006.01)
(Continued)

(52) U.S. Cl.
CPC .......... *H04L 67/10* (2013.01); *G06F 17/30073* (2013.01); *G06F 17/30126* (2013.01); *G06F 17/30286* (2013.01)

(58) Field of Classification Search
USPC .................................................. 709/223–232
See application file for complete search history.

(56) References Cited

U.S. PATENT DOCUMENTS 5,602,852 A    2/1997 Shiobara
5,706,457 A    1/1998 Dwyer et al.
(Continued)

FOREIGN PATENT DOCUMENTS

WO    WO0152502    1/2001

OTHER PUBLICATIONS

Peter Flynn, Revised ARCHIE shell script for HTTP servers, v0.95b (No date) http://www.ucc.ie/info/net/archiedoc.

(Continued)

*Primary Examiner* — Evans Desrosiers
(74) *Attorney, Agent, or Firm* — Goodwin Procter LLP

(57) ABSTRACT

Embodiments of the invention are directed to a computer-implemented system and method for data exchange management. The method may incorporate a physical data exchange management system and/or a logical data exchange management system. The method may include storing a data exchange profile for each communicating entity, receiving a request for data exchange from one of the communicating entities, and processing the request through a request handler for handling receipt of data exchange requests from the communicating entities, wherein the request handler accesses a relevant data exchange profile for the requesting communicating entity. The method may additionally include formatting data for exchange in accordance with the relevant data exchange profile and delivering the formatted data to a destination in accordance with the relevant data exchange profile.

28 Claims, 11 Drawing Sheets

Related U.S. Application Data continuation of application No. 10/473,994, filed on Mar. 3, 2004, now abandoned, and a continuation-in-part of application No. 09/439,909, filed on Nov. 12, 1999, now Pat. No. 6,557,039.

(51) Int. Cl.
*G06F 17/30* (2006.01)
*G06F 7/00* (2006.01)

(56) References Cited

U.S. PATENT DOCUMENTS

| | | | |
|---|---|---|---|
| 5,732,214 A * | 3/1998 | Subrahmanyam | 709/227 |
| 5,751,958 A | 5/1998 | Zweben et al. | 709/204 |
| 5,764,972 A | 6/1998 | Crouse et al. | 707/1 |
| 5,790,789 A | 8/1998 | Suarez | 709/202 |
| 5,832,524 A | 11/1998 | Jarvenpaa | |
| 5,870,545 A | 2/1999 | Davis et al. | 709/201 |
| 5,903,889 A | 5/1999 | de la Huerga et al. | 707/3 |
| 5,937,388 A | 8/1999 | Davis et al. | 705/8 |
| 5,956,733 A | 9/1999 | Nakano et al. | 707/204 |
| 6,018,627 A | 1/2000 | Iyengar et al. | 717/103 |
| 6,115,035 A | 9/2000 | Compton et al. | |
| 6,144,797 A | 11/2000 | MacCormack et al. | |
| 6,304,967 B1 | 10/2001 | Braddy | |
| 6,317,751 B1 | 11/2001 | Yeger et al. | 707/661 |
| 6,388,687 B1 | 5/2002 | Brackett et al. | |
| 6,411,724 B1 | 6/2002 | Vaithilingam et al. | |
| 6,442,296 B1 | 8/2002 | Smith et al. | |
| 6,554,504 B2 | 4/2003 | Cook et al. | |
| 6,557,039 B1 * | 4/2003 | Leong et al. | 709/229 |
| 6,721,783 B1 | 4/2004 | Blossman et al. | |
| 6,757,720 B1 * | 6/2004 | Weschler, Jr. | 709/220 |
| 6,801,946 B1 | 10/2004 | Child et al. | |
| 6,886,047 B2 | 4/2005 | Leong et al. | 709/246 |
| 6,928,481 B1 | 8/2005 | Harris et al. | |
| 6,957,433 B2 | 10/2005 | Umberger et al. | |
| 7,013,298 B1 | 3/2006 | De La Huerga | 707/3 |
| 7,069,278 B2 | 6/2006 | Leong et al. | |
| 7,111,169 B2 | 9/2006 | Ripley et al. | |
| 7,143,437 B2 | 11/2006 | Heil et al. | |
| 7,155,368 B2 | 12/2006 | Revie | |
| 7,584,241 B2 | 9/2009 | Kureshy et al. | |
| 8,031,645 B2 | 10/2011 | Atarius et al. | |
| 8,082,322 B1 | 12/2011 | Pascarella et al. | 709/218 |
| 2001/0044879 A1 | 11/2001 | Moulton et al. | |
| 2004/0107125 A1 * | 6/2004 | Guheen et al. | 705/7 |
| 2005/0216421 A1 | 9/2005 | Barry et al. | 705/64 |
| 2012/0117348 A1 | 5/2012 | Triantafillou et al. | |
| 2012/0284057 A1 | 11/2012 | Hasan et al. | |
| 2012/0290676 A1 | 11/2012 | Leong et al. | |

OTHER PUBLICATIONS

FTPSearch, (1997) http://ftpsearch.ntnu.no/pub/ftpsearch.
FTPSearch, (No date)###http://www.alltheweb.com.
PCT International Search Report dated May 31, 2000, six pages.
Ashizawa, M., et al., "Using digital libraries as a community hall for worldwide information spiral development", Transactions of the Institute of Electronics, Information and Communication Engineers D-II, May 1998, Inst. Electron. Inf. & Commun. Eng. Eng., Japan, vol. J81D-II, No. 5, pp. 1014-1024, XP00910377.
Bhasker, B., et al., "Architecture and implementation of an on-line data archive and distribution system", Proceedings Twelfth IEEE Symposium on Mass Storage Systems. Putting All that Data to Work (CAT. No. 93CH3246-6), Proceedings of $12^{th}$ IEEE Symposium on Mass Storage Systems, Monterey, CA, USA Apr. 26-29, 1993, pp. 177-182, XP002138055 1993, Los Alamitos, CA USA IEEE Comput. Soc. Press, USA ISBN: 0-8186-3460-X.
Nancy McGough, Archite, FTP, and Uncompression (Aug. 16, 1993) http://ww.ii.com/internet/ftp/archie_ftp_uncompression.

* cited by examiner

DATA EXCHANGE MANAGEMENT SYSTEM AND METHOD

CONTINUING DATA

This application is a continuation application of U.S. application Ser. No. 12/178,065, filed on Jul. 23, 2008, which is a continuation in part of U.S. application Ser. No. 11/028,061, filed on Jan. 4, 2005, now U.S. Pat. No. 8,255,568, which is a continuation of U.S. patent application Ser. No. 10/413,994, filed on Apr. 16, 2003, now U.S. Pat. No. 6,886,047, which is a continuation in part of application Ser. No. 09/439,909, filed on Nov. 12, 1999, now U.S. Pat. No. 6,557,039.

TECHNICAL FIELD

Embodiments of the invention are related generally to systems and methods for facilitating the exchange of electronically stored resources between participating entities. In particular, embodiments of the invention are related to systematically exchanging electronically stored resources in a manner dictated by the participating entities.

BACKGROUND OF INVENTION

In many diverse types of industries, business entities are frequently required to exchange large volumes of information with other entities. Historically, this information has been encapsulated through various media, including paper, microfiche, magnetic tapes, computer disks, or other electronic storage devices. Currently, the information stored within these various media is often captured electronically and is stored in one or more electronic storage archives. Typically, these electronic storage archives allow long term archival of document bitmap images, computer generated reports, office documents such as word processing documents and spreadsheets, audio and video files, etc.

The hardware typically incorporated in an electronic archive is comprised of one or more general purpose computer and storage devices. The hardware may be operated and accessed by software comprising an operating system, database management systems, hierarchical storage management software (HSM), and archive management software. Often, large corporations require geographically diverse heterogeneous archival systems in order to support the various operations of the corporation.

A business may manage an archiving system for storing information transmitted by multiple organizations. For example, a bank may centrally manage an archive that stores information transmitted by internal customers, such for example, as a mortgage division, a commercial loan division, or a small business loan division. The archiving system may also store information transmitted by external customers, such as independent businesses using banking services. Each internal or external customer may act as a transmitting organization and may send information in a particular format. The archiving system may store information in a format that differs from the transmitted format. Each archive within the archiving system may have specific formatting requirements and may store resources only in these predetermined formats. Furthermore, the transmitting organizations and other organizations may ultimately require retrieval of the stored information. Retrieving organizations, which may also include external and internal customers, each may each require retrieval in a specified format that differs from the required storage format.

With the escalating use of electronic communication modes, organizations have become increasingly demanding with respect to transmission of information, particularly with respect to images. Demands have become bidirectional in that organizations frequently both request transmittal and retrieval of information simultaneously. Furthermore when retrieving information, organizations may make requests for both metadata file changes and image file format changes.

Currently existing archiving and data flow management systems often provide requested resources in a standard output format. Some systems are available that process customer input in the customer's format and convert the transmitted information to metadata files. However, these systems do not otherwise change format and do not change format in accordance with customer requests. Furthermore, these systems do not convert image format even if requested by internal or external customers.

Thus, a system is needed that is capable of facilitating exchange of data with customers, particularly with customers requiring transmission and receipt of large volumes of documents that include items such as images in various formats. Thus, a system is needed that stores and implements a conversion protocol for exchange of data between two or more parties such that once that the conversion protocol exists, the conversion occurs automatically. The system should be bi-directional to allow import and export of resources.

SUMMARY OF THE INVENTION

In one aspect of the invention, a computer implemented data exchange management system is provided for managing data exchange between a data storage facility and communicating entities. The data exchange management system may include a stored data exchange profile for each communicating entity and a request handler for handling receipt of data exchange requests from the communicating entities. The request handler may access a relevant stored data exchange profile for a requesting communicating entity and may handle data exchange requests for export of stored data and data exchange requests for import of data for storage in the data storage facility. The data exchange management system may also include a formatting engine for formatting data in accordance with the relevant data exchange profile and a delivery engine for delivering the data to a destination in accordance with relevant data exchange profile.

In a further aspect of the invention, a computer implemented data exchange management method is provided for managing data exchange between a data storage facility and communicating entities. The data exchange management method comprises storing a data exchange profile for each communicating entity, receiving a request for data exchange from one of the communicating entities, and processing the request through a request handler for handling receipt of data exchange requests from the communicating entities. In accordance with the method, the request handler accesses a relevant data exchange profile for the requesting communicating entity and handles data exchange requests for export of stored data and data exchange requests for import of data for storage in the data storage facility. Data is formatted for exchange in accordance with the relevant data exchange profile. The method further includes delivering the formatted data to a destination in accordance with the relevant data exchange profile.

In an additional aspect of the invention, a computer implemented data exchange management system is provided for managing data exchange between data storage facilities and communicating entities. The data exchange management system comprises a physical data exchange management system for management of data stored in a first designated area. The physical data exchange management system may include a stored data exchange profile for each communicating entity and a request handler for handling receipt of physical data exchange requests from the communicating entities, the request handler accessing a relevant stored data exchange profile for a requesting communicating entity, and handling data exchange requests for export of stored data and data exchange requests for import of data for storage in the data storage facility. The physical data exchange management system may additionally include a formatting engine for formatting data in accordance with the relevant data exchange profile and a delivery engine for delivering the data to a destination in accordance with relevant data exchange profile. A logical data exchange management system may be provided for managing exchange of data stored in a second designated area, the logical data exchange management system comprising a request handler for handling logical document exchange requests and an ownership transfer engine for transferring ownership in accordance with the logical document exchange requests.

In yet an additional aspect of the invention, a computer implemented logical data exchange management system is provided for managing logical data exchange between data storage facilities and communicating entities. The logical data exchange management system may comprise a request handler for handling receipt of logical data exchange requests from the communicating entities, the request handler accessing a relevant stored partner profile for a requesting communicating entity and handling data exchange requests for access to stored data stored within one of multiple virtual industry archives of the data storage facilities. The logical data exchange management system may additionally comprise a locating engine for locating the data stored in the virtual industry archives and an ownership transfer engine for transferring ownership of the stored data in accordance with the logical document exchange requests.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a data exchange management system for controlling receipt and transmission of data from a central location. The data exchanged may include documents, images, or any other type of data that requires exchange. The proposed system manages these demands by automating transmission in both directions based on a data exchange profile that contains rules for each requesting customer. The data exchange profile determines necessary operations based on the stored customer rules. For instance, some customers may require transformation of images from one format to another format or reformatting of metadata based on customer preferences. When delivery is requested, the system will assemble data based on specifications of the requester or customer. Depending upon the customer, data extraction may be performed from a particular repository. Furthermore, customers expecting delivery of data may request a method and security control for delivery and this information will be reflected in the data exchange profile.

Figure 1:
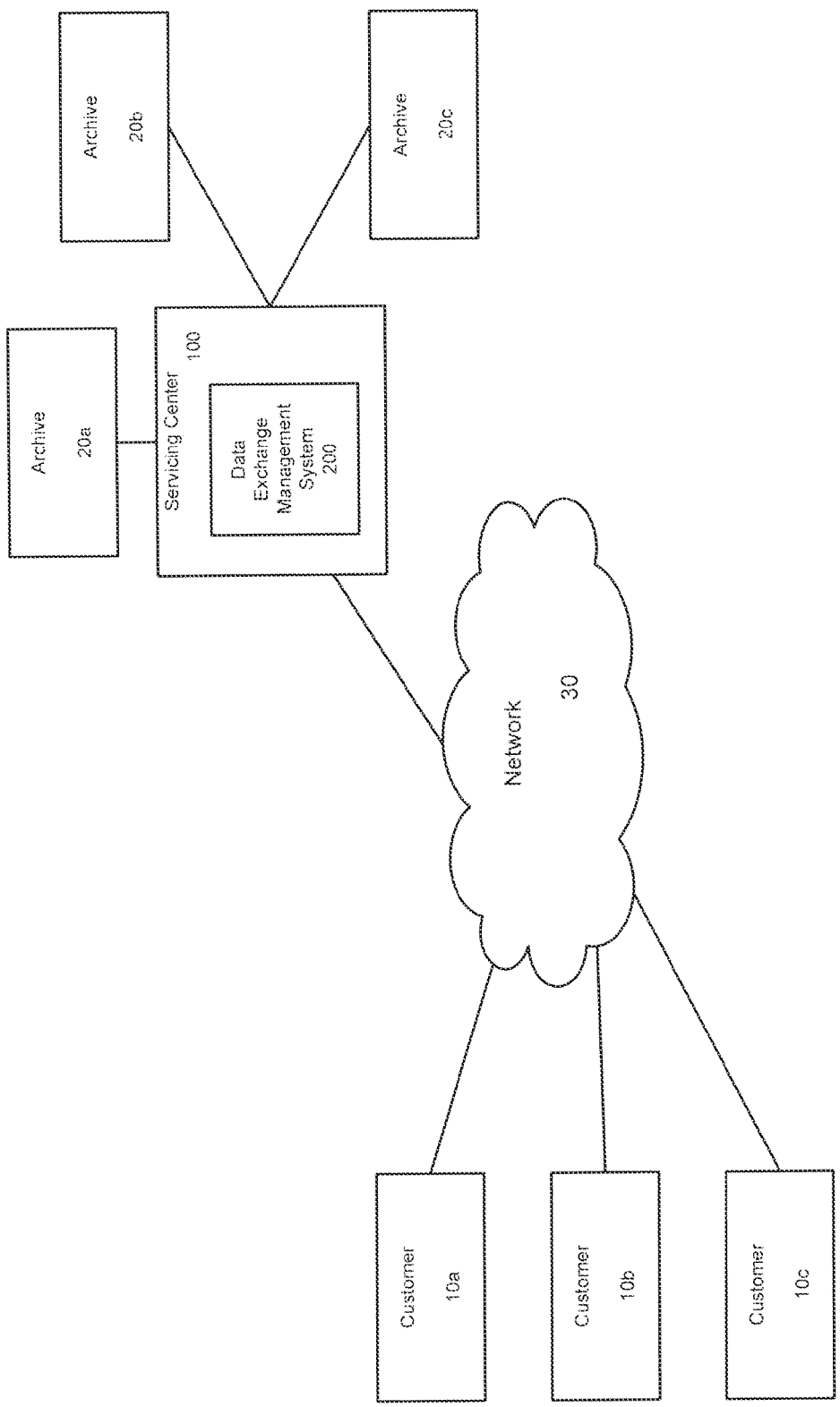
FIG. 1 is a block diagram illustrating an operating environment for a data exchange management system in accordance with an embodiment of the invention.

FIG. 1 is a block diagram illustrating an operating environment for a data exchange management system in accordance with an embodiment of the invention. Multiple customers 10*a*, 10*b*, 10*c* may be characterized as communicating entities that communicate over a network 30 with a servicing center 100 that utilizes multiple archives 20*a*, 20*b*, and 20*c* for data storage. The archives 20*a*, 20*b*, and 20*c* may be or include various types of document repositories that may be accessed by the servicing center 100, which may extract information from the various repositories in an efficient manner and may pre-sort extracted data to optimize performance.

As will be further explained below with reference to FIG. 5, in addition to the document repositories, virtual industry archives may be configured to serve an industry group. For instance, one archive might support commercial loans, one may support mortgages, one may support consumer loans, etc. The servicing center 100 may include or may be connected with a central management system that monitors activities pertaining to each individual archive. The central management system may perform many functions including security and authentication functions.

The servicing center 100 may include or be connected with a data exchange management system 200 and may be adaptable to accommodate a single industry or multiple industries, such as the banking industry, the insurance industry, the medical industry, and business partnerships between entities participating in these and any other entities. In embodiments of the invention, the data exchange management system 100 can accommodate multiple types of relationships, including one to many, one-to-one, many to one, etc. As an example of a one-to-one relationship, a mortgage company may sell a block of loans on a regular schedule and may implement an additional party for insurance processing. The additional party may require that a specific type of document be received for every sale of a block of loans. In a one-to-many relationship business partners may jointly take out a mortgage loan and each business partner may require access to the loan documents. In a many-to-one relationship, a business may take multiple commercial loans from different banks and may require access to all of the documents stored by each bank. In embodiments of the invention, the data exchange management system 100 may schedule and process the transfer of the document in accordance with the preferences of the parties and without substantive efforts on the part of any of the parties.

Figure 2A:
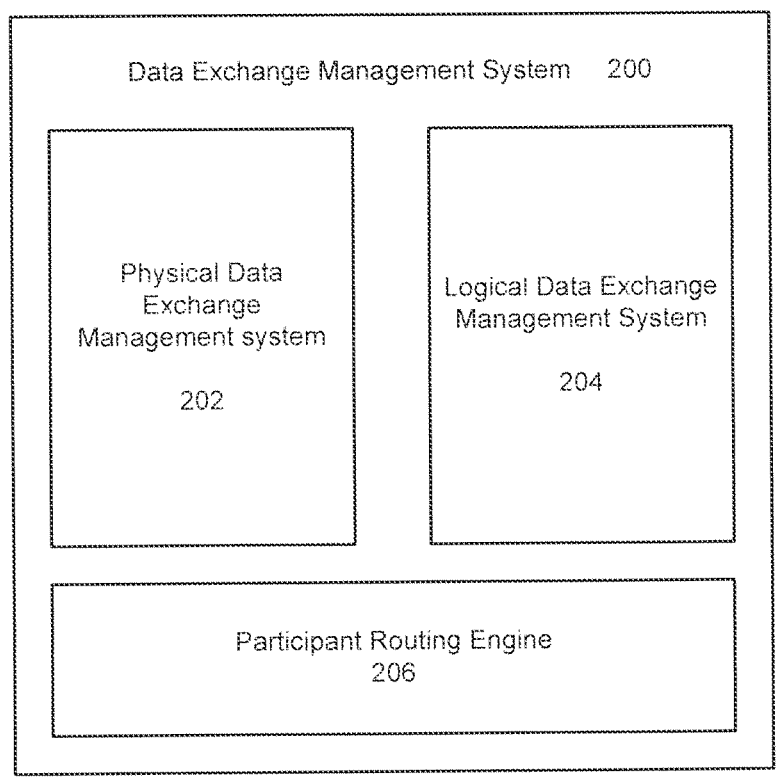
FIG. 2A is a block diagram illustrating components of a data exchange management system in accordance with an embodiment of the invention.

FIG. 2A is a block diagram illustrating components of a data exchange management system 200 in accordance with an embodiment of the invention. The data exchange management system 200 may include a physical data exchange management system 202 and a logical data exchange management system 204. The data exchange management system 200 may further include a participant routing engine 206 that determines whether an incoming request should be handled by the physical data exchange management system 202 or the logical data exchange management system 204. As will further explained below, participants in the system may be eligible to utilize either one of the physical or logical management systems and in some instances may be able to select between use of the two management systems.

Furthermore, it should be understood that the data exchange management system 200 may include either the physical data exchange management system 202 or the logical data exchange management system 204 and need not include both systems. Specific storage schemes, such as virtual industry archives, which will be described in detail below, may eliminate the need in some systems for physical delivery of documents. In systems that do not include such archives, physical delivery and retrieval of data will typically be necessary. In some embodiments, a system may begin with a physical document exchange management system. If the system experiences growth and a virtual industry archiving system becomes available, a logical data exchange management system may later be added.

Figure 2B:
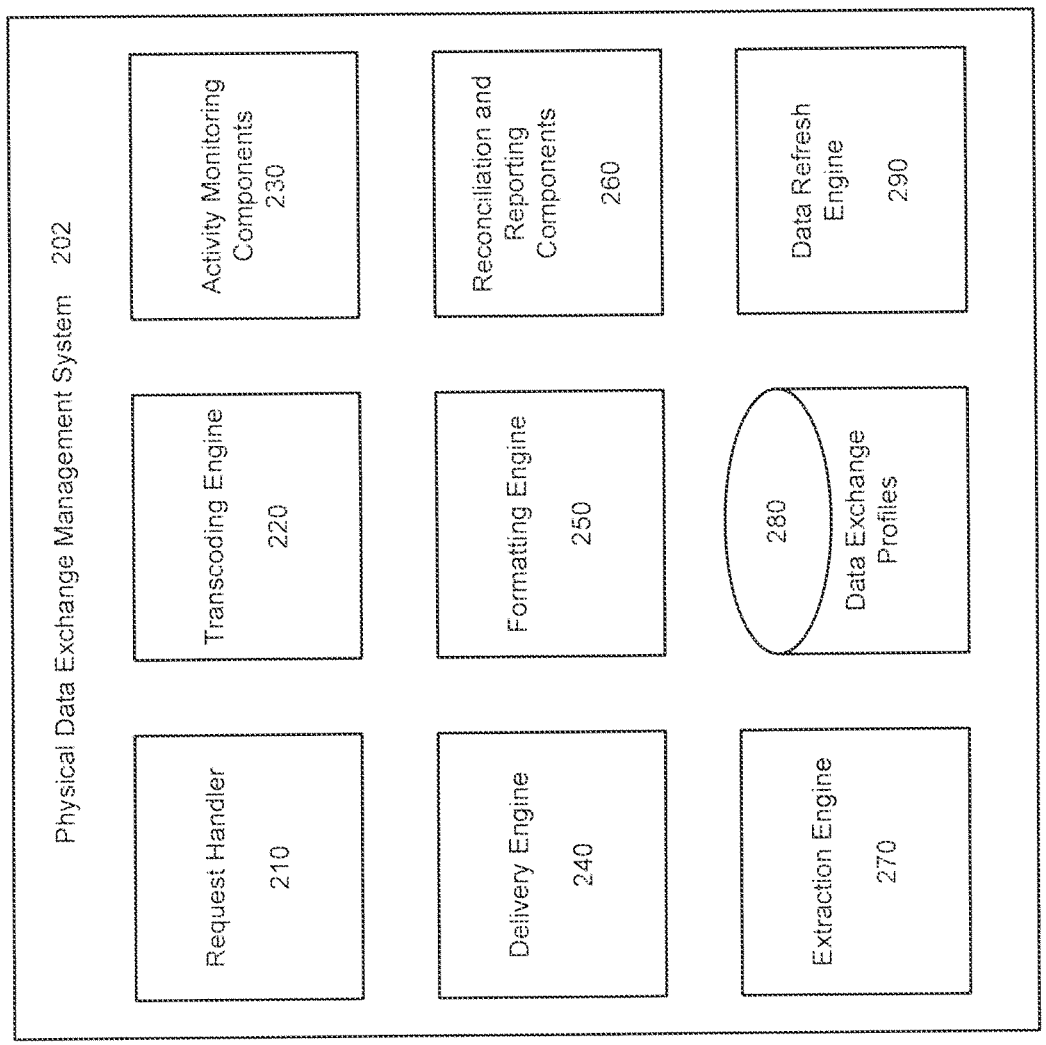
FIG. 2B is a block diagram illustrating components of a physical data exchange management system in accordance with an embodiment of the invention.

FIG. 2B illustrates details of the physical data exchange management system 202 in accordance with an embodiment of the invention. The physical data exchange management system 202 may include a request handler 210, a transcoding engine 220, activity monitoring components 230, a delivery engine 240, a formatting engine 250, reconciliation and reporting components 260, extraction engine 270, data exchange profiles 280, and a data refresh engine 290.

The request handler 210 may be provided for handling incoming requests from communicating entities such as the customers 10a, 10b, and 10c from FIG. 1. The request handler 210 may access the data exchange profiles 280 for determining how to process an incoming request. The request handler 210 recognizes the originator of the request and ensures that the request is recognizable, complete, and accurate and can be identified with a specific requestor. The request handler 210 may also analyze the incoming data requests for encryption and keys in order to facilitate scheduling. The request handler 210 may schedule processing either by automatic implementation of business rules or through interaction with stored business rules in combination with human operators.

The data exchange profiles 280 preferably include a set of rules for each communicating entity. The set of rules may contain information pertaining to format, encryption, compression, and delivery of data. The following table illustrates possible available functionality, but should not be construed as limiting. Many other possibilities are within the scope of the invention. For example, other formats, such as 3-dimensional CAD drawings, or drawings creating by mapping software may be converted or may be created based on originally presented data.

| SOURCE DOCUMENT FORMATS |
|---|
| TIFF-G4 (Bi-tonal) |
| TIFF-JPEG (Gray scale, Color or mixed types) |
| PDF with text only (no image) |
| PDF with image (versions unknown) |
| PDF with image (version 1.3 or older) |
| PDF with image (Version 1.4 or newer) |
| PDF with image (with JBIC2 or JPEG2000 advanced compressions) |
| PDF/A-1A (ISO standard for archive) |
| PDF/A-1B (ISO standard for archive |
| AFP |
| PNG/GIF/other common image formats |
| Audio files |
| Video files |
| Microsoft Office documents (Word, Excel, Powerpoint, etc) |
| XML/HTML |
| TARGET DOCUMENT FORMATS |
| TIFF files with orginal compressions |
| TIFF files with G4 & JPEG only, converted from JPEG2000/JBIG2 |
| PDF as stored |
| PDF V1.3 only (convert if other PDF versions found) |
| PDF V1.4 (convert if other PDF versions found) |
| PDF V1.5 (convert if other PDF versions found) |
| PDF/A-1a |
| PDF/A-1b |
| Audio files |
| Video files |
| Microsoft Office documents (Word, Excel, Powerpoint, etc) |
| XML/HTML |

Thus, the request handler 210 determines through the information stored in the data exchange profiles 280, how incoming data is formatted and/or encrypted and how outgoing data should be formatted and/or encrypted.

Preferably, when the data exchange management system receives a request for a new partner exchange, a system developer configures a profile for storage as a data exchange profile 280 and operationalizes the profile so that customer may simply send a list or a schedule that can be automatically acted upon through the data exchange profile 280. Each created data exchange profile preferably thoroughly describes data exchange processes with respect to the partners so that the request handler 210 will automatically and reliably handle requests. Thus, all information required to process a request from a requestor should be encapsulated in data exchange profile 280.

The transcoding engine 220 may compress or decompress data in accordance with information provided in the data exchange profile 280. In the case of incoming data, the transcoding engine 220 ensures that the delivered data is appropriately compressed for storage in data archives. In the case of outgoing data, the transcoding engine 220 ensures that compression of the outgoing data is revised as necessary for delivery to the requesting customer in accordance with the data exchange profile 280.

The extraction engine 270 may be implemented upon receipt of a request to export data in order to extract data from one or more of multiple document repositories or archives. For example, in a banking environment, document repositories may include a repository for bank statements, a repository for check images, a repository for loan documents, etc. A request from a customer may include a request for information related to thousands of account numbers and may require extraction from multiple locations. The extraction engine 270 may thus sort requests by storage media to optimize performance. Thus, when the item requested is old and is stored on tape, the extraction engine may extract everything from those thousands of account numbers from particular tape once without repeatedly accessing the tape. Additionally, because the data may be stored in multiple locations and on multiple types of media, the extraction engine 270 may be required to locate the requested data prior to extraction. Once the requested data is extracted, the extraction engine 270 directs the extracted data to the request handler 210 to implement the data exchange profiles 280 that dictate whether the requestor requires the system to transform images, reformat metadata, or perform other operations. Multiple pieces of requested data may be extracted in parallel. Furthermore, extractions may require scheduling if the requested data involves large files. The data exchange profile 280 determines the delivery rules for the extracted data so that the final package for delivery may be put together based on the specifications of the requestor to contain encryption, authentication, or other desired features.

The formatting engine 250 may format metadata and format a package of data for delivery. Formatting may include such actions as table translations, content encryption, and authentication. With respect to table translations, one partner may have different document reference names than another partner. The table translation facilities provide the proper reference information. With respect to encryption, data may be encrypted or decrypted as set forth in the profile 280. The profile 280 may require the formatting engine 250 to create a document control such as a water-mark, a self-destruction mechanism, a read-only format, or another mechanism for digital rights management. Encryption techniques may be applied to selected data or to an entire package of data. With respect to authentication, the formatting engine 250 may implement a hashing method to create a hashing key.

Delivery engine 240 may be provided to deliver data both to designated repositories and to communicating entities. The delivery engine 240 delivers data in the manner specified in the relevant data exchange profile 280. Delivery can take many forms including physical media, such as CD ROM, DVD, tape, or electronic transmissions. As set forth above, if dictated by the exchange profile 280, the entire package for delivery may be encrypted.

Activity monitoring components 230 assist non-technical personnel with monitoring data exchange steps. The activity monitoring components 230 may provide a user interface for system users to view data exchange tasks as well as the status of each data exchange task and statistics regarding data exchange tasks. Furthermore, activity monitoring components 230, such as an activity monitoring log may allow non-technical personnel to understand the processes underway with data and may further notify the non-technical personnel when intervention is required.

Reconciliation and reporting components 260 may be available to track exchanged data and generate reports relevant to data exchanges. The generated reports may be viewed by system administrators and may be utilized for continual modification for improvement of the data exchange management system 200.

The data refresh engine 290 may be available to ensure that stored data remains in a valid format over time. As software changes over time, some data formats become obsolete and can no longer be read. Thus, the data refresh engine 290 may ensure that original data is preserved in a usable format. The particular format selected may be decided by system default settings or alternatively, by information in the data exchange profiles 280 submitted over time by system participants.

Thus, in order to fulfill the demands of the physical data exchange management system 202, components must be available that are capable of reformatting, compression, decompression, translation, authentication, encryption, delivery, and reconciliation reporting.

Figure 2C:
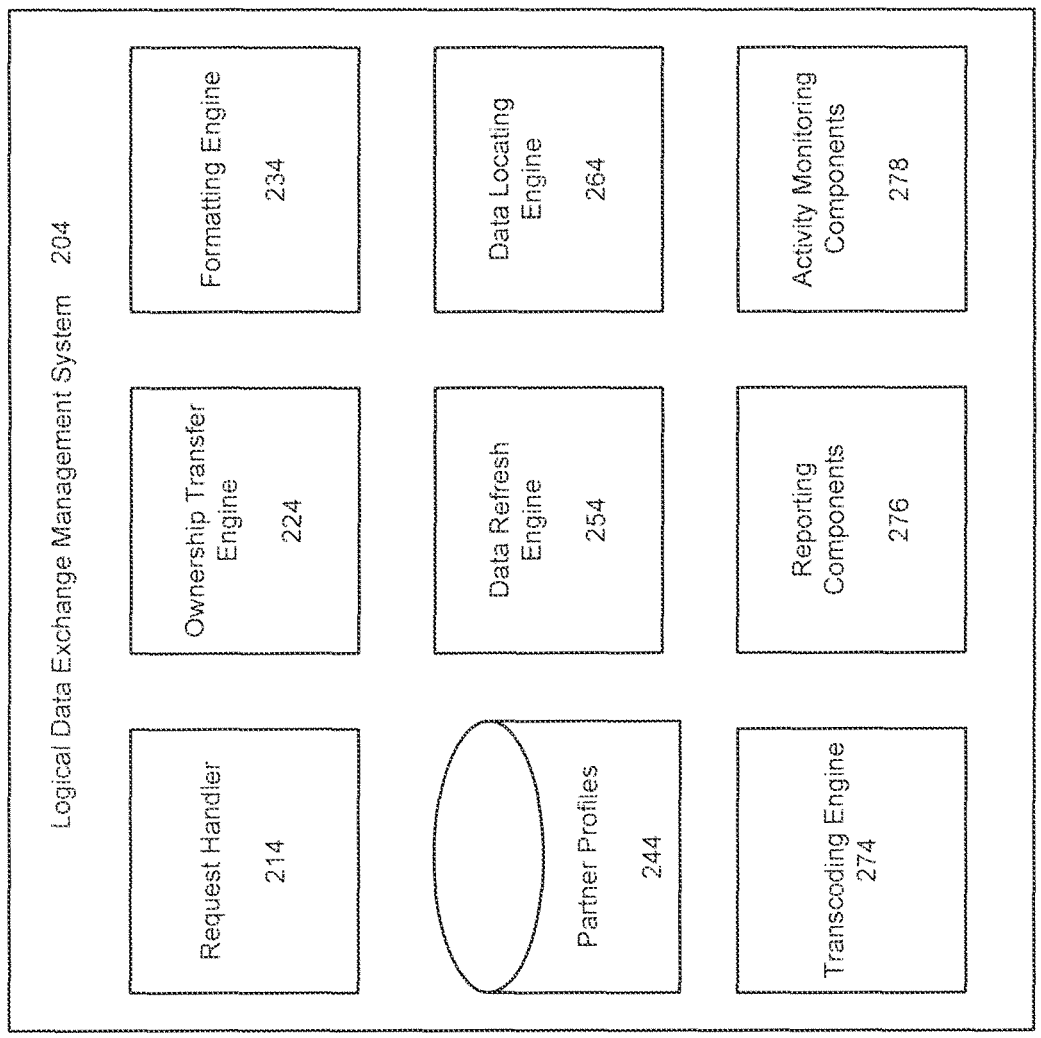
FIG. 2C is a block diagram illustrating components of a logical data exchange management system in accordance with an embodiment of the invention.

FIG. 2C illustrates an embodiment of the logical data exchange management system 204 in accordance with an embodiment of the invention. The logical data exchange management system 204 may include a request handler 214, an ownership transfer engine 224, a formatting engine 234, partner profiles 244, a data refresh engine 254, and a data locating engine 264. The logical data exchange management system 204 may also include a transcoding engine 274, reconciliation and reporting components 276, and activity monitoring components 278, which operate substantially as those described above with reference to FIG. 2B.

The request handler 214 may operate similarly to the request handler described above in processing participant requests. Rather than physically delivering documents, upon receiving a request, the request handler 214 may implement the ownership transfer engine 224 to alter data ownership. Ownership may be changed by altering security settings or changing the location of data to conform to a partner-specified location. Such a partner-specified location may be contained within partner profiles 244. The partner profiles 244 may be similar to the data exchange profiles described above and may contain partner specified preferences. In the context of the logical data exchange management system 204, the partner profiles 244 will be maintained for those partners entitled to access data on the system.

In some instances, the partner profiles may contain formatting information. In these instances, the formatting engine 234 may implement the specified formatting. The data locating engine 264 may be implement to locate data within virtual industry repositories as will be further explained below. As explained above with respect to FIG. 2B, the data refresh engine 290 ensures that data remains stored in a valid format over time.

Although the logical data exchange management system 204 may include the same or similar components as the physical data exchange management system 202, the logical data exchange management system 204 does not require physical delivery or extraction, no extraction engine or delivery engine is required.

The components shown in FIGS. 1 and 2A-C above may be or include a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™ operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component mechanism, or tool. The data exchange management system 200 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal Prolog, REXX and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 3:
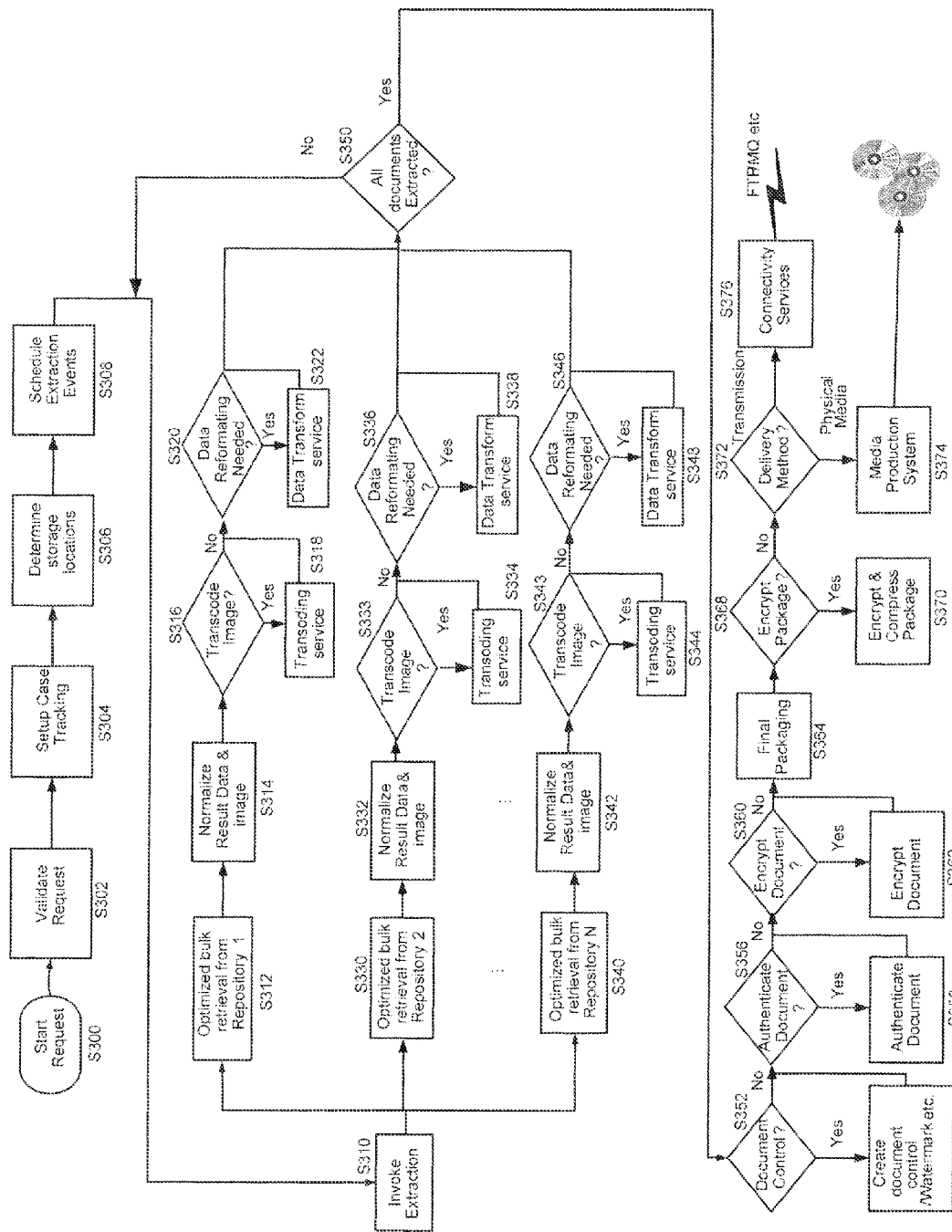
FIG. 3 is a flow chart illustrating a method for processing a data exportation request in accordance with an embodiment of the invention.
Figure 4:
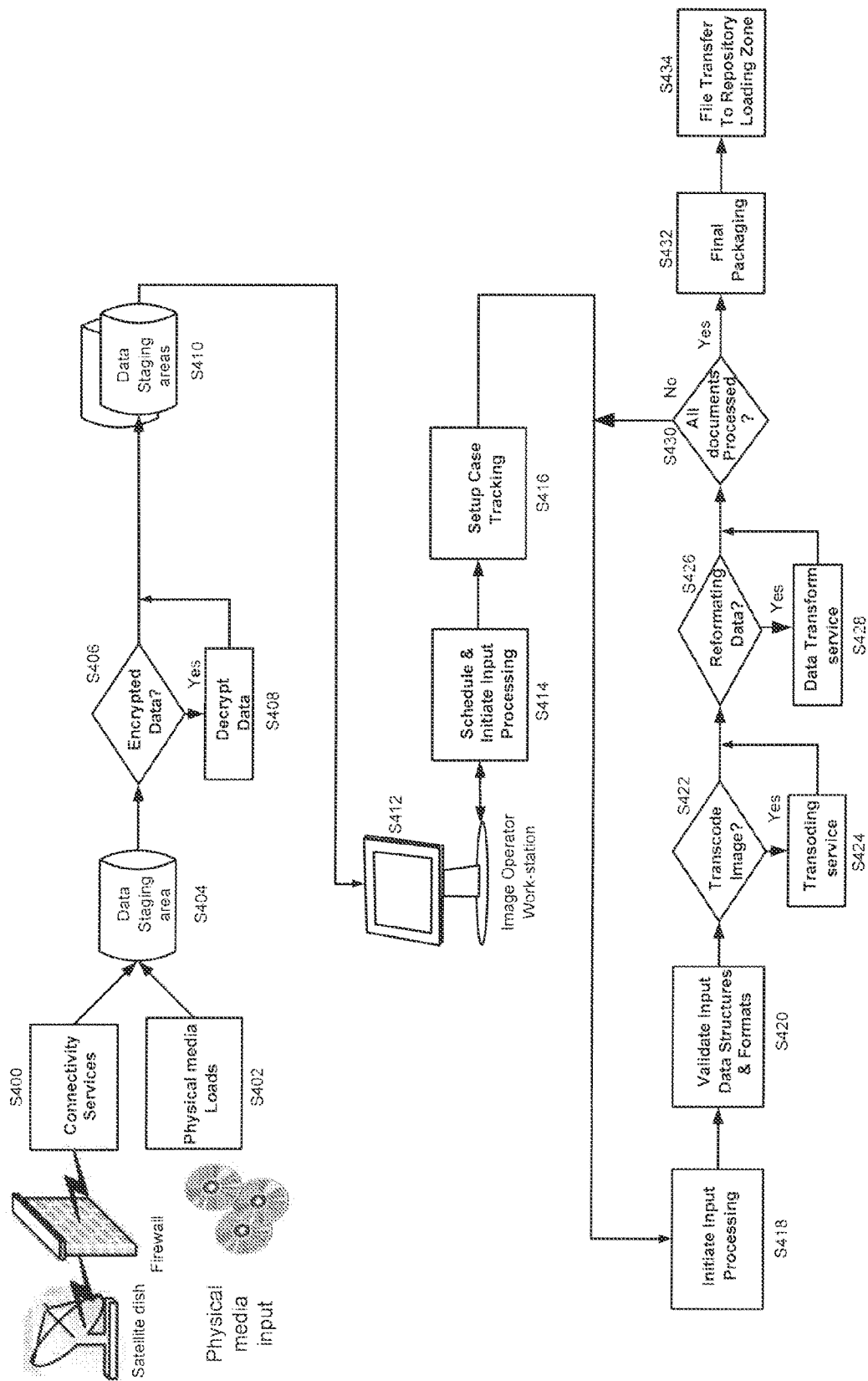
FIG. 4 is a flow chart illustrating a method for processing a data importation request in accordance with an embodiment of the invention.

FIGS. 3 and 4 illustrate the operation of the physical data exchange management system as described above with reference to FIG. 2B. FIG. 3 illustrates handling of a data exportation request and FIG. 4 illustrates processing of a data importation request.

FIG. 3 is a flow chart illustrating a method for processing a data exportation request in accordance with an embodiment of the invention. The method starts in S300 upon the receipt of a request. The data exchange management system implements the request handler to in S302 to validate the request, in S304 to setup case tracking, in S306 to determine storage locations of the requested data, and in S308 to schedule extraction with the extraction engine.

In S310, the extraction engine of the data exchange management system invokes extraction of the requested data. As illustrated, the extraction may occur in parallel from multiple repositories. For example, in S312 optimized bulk retrieval may occur from Repository 1. In S330, optimized bulk retrieval may occur from repository 2 and in S340, optimized bulk retrieval may occur from Repository N. Thus, data may be extracted simultaneously from any N number of repositories. After extraction, in S314, S332, and S342, the extracted data may be normalized. Normalization may include ensuring that the extracted data has the proper meaning to the requesting party. In some instances, different parties may interpret data differently and a translation table may be provided to ensure that the data is properly interpreted by all requesting parties. In S316, S333, and S343, the data exchange management system may determine whether the data, which may include an image, should be transcoded (compressed or decompressed). If transcoding is necessary, transcoding occurs in S318, S334, and S444. If no transcoding is needed, the system determines whether data reformatting is needed in S320, S336, and S346. If data is reformatting is needed, the formatting engine formats the data in S322, S338, and S348.

In S350, the extraction engine determines whether all data have been extracted. If all data have not been extracted in S350, the system returns to S310. If all data have been extracted, the system moves forward to S352 to determine whether document control or digital rights management is necessary. If document control or digital rights management is necessary in S352, the formatting engine may create a document control in S354. In S356, the system determines whether it is necessary to authenticate the document before delivery. If authentication is necessary, the system authenticates the document in S358. In S360, the data exchange management system determines whether it is necessary to encrypt the document. If it is necessary to encrypt the document, the system encrypts the document in S362.

In S364, the delivery engine performs final packaging. In S368, the delivery engine determines whether it is necessary to encrypt the package. If encryption is necessary, the system encrypts and compresses the package in S362. In S372, the delivery engine determines a delivery method. If the delivery method is via physical media, the delivery engine performs this delivery via a media production system in S374. If the delivery method is electronic transmission, the delivery engine accesses connectivity services in S376 and delivery is completed.

FIG. 4 is a flow chart illustrating a method for processing a data importation request in accordance with an embodiment of the invention. The process begins in S400 and in S402, data is either loaded electronically or through physical media and arrives at a data staging area in S404. In S406, the data exchange management system determines if the data is encrypted and decrypts the data in S408 if the data is encrypted. The system transfers the decrypted data to the staging area in S410. From the data staging area, data is visible via an image operator work station in S412. The operator may schedule input processing in S414 and setup case tracking in S416. In S418, the system initiates input processing as scheduled. In S420, the system validates input data structures and formats. In S422, the system determines whether it is necessary to transcode data such as images. If such transcoding is necessary, the transcoding is performed in S424. In S426, the system determines whether it is necessary to reformat data. If reformatting is necessary in S426, the system performs the reformatting in S428.

In S430, the system determines whether all documents have been processed. If all documents have not been processed, the system returns to S418 to initiate input processing. If all documents have been processed, the system continues to final packaging at S432 and performs a file transfer in S434.

Figure 5:
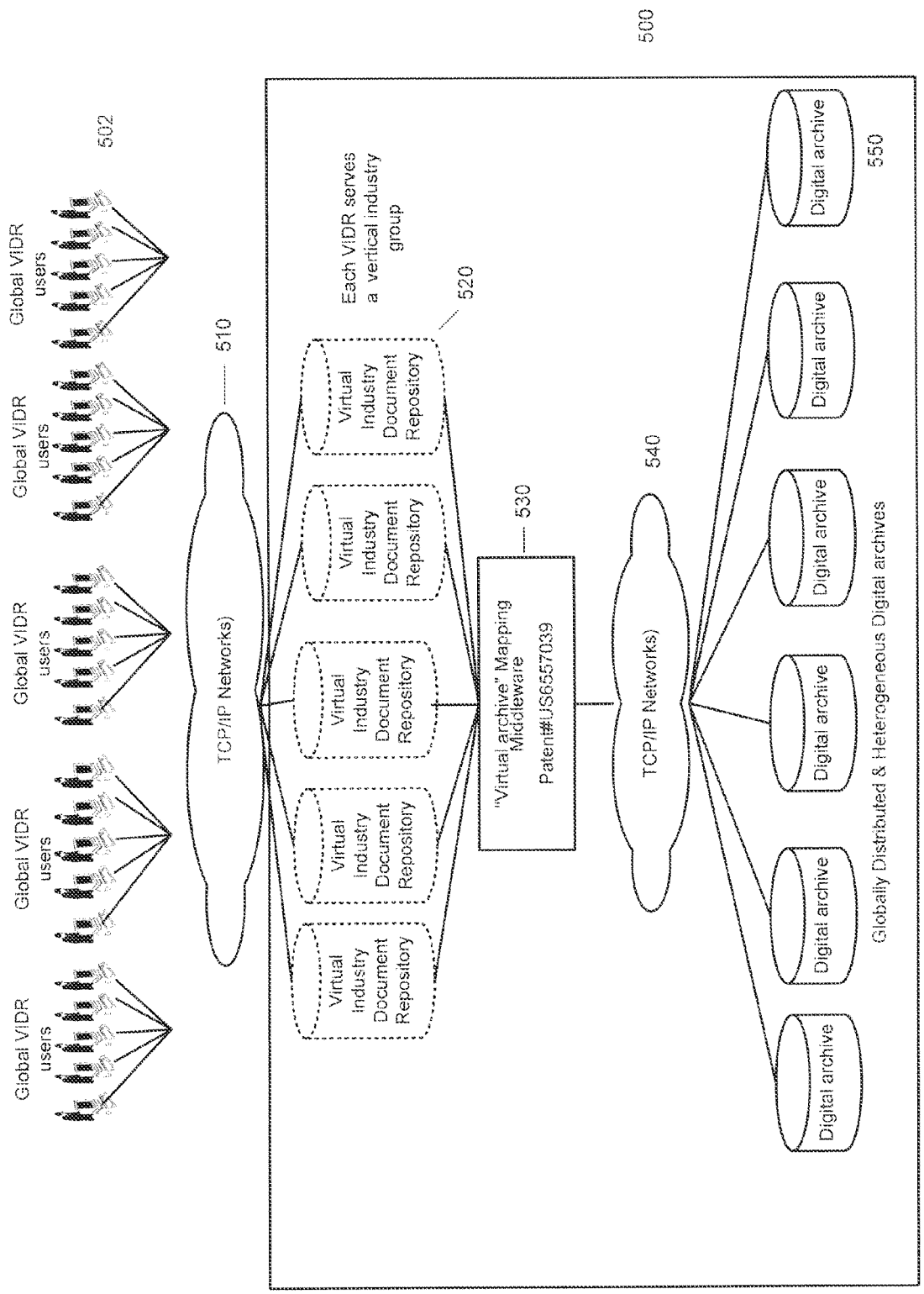
FIG. 5 is a block diagram illustrating an archiving system for use in combination with the data exchange management system in accordance with an embodiment of the invention.

FIG. 5 is a block diagram illustrating the addition of a virtual archiving system for use in combination with the logical data exchange management system in accordance with an embodiment of the invention. The system may include distributed digital archives 550 connected over one or more networks 540 with virtual archive mapping middleware 530 as disclosed in U.S. Pat. No. 6,557,039, from which the present application claims priority. Thus, the entirety of the disclosure of this patent is incorporated by reference. The distributed digital archives 550 may be implemented heterogeneously to store participant data. The physical data exchange management system may extract data from and deliver data to these distributed digital archives 550.

The middleware 530 may map to virtual industry document repositories 520. In embodiments of the invention, the virtual industry document repositories 520 may each serve a virtual industry group. The repositories 520 may be accessible to virtual industry document repository users 502 through one or more networks 510. Virtual repositories may be created for example for the mortgage loan industry, the commercial loan industry, the insurance industry, the auto parts industry, etc. If a requestor is a participant in the virtual industry document repository system 520, the logical data exchange management system may be implemented to control access through changing ownership, such as by altering access rights or moving data from one repository to another or from one part of a repository to another part of the repository.

Figure 6:
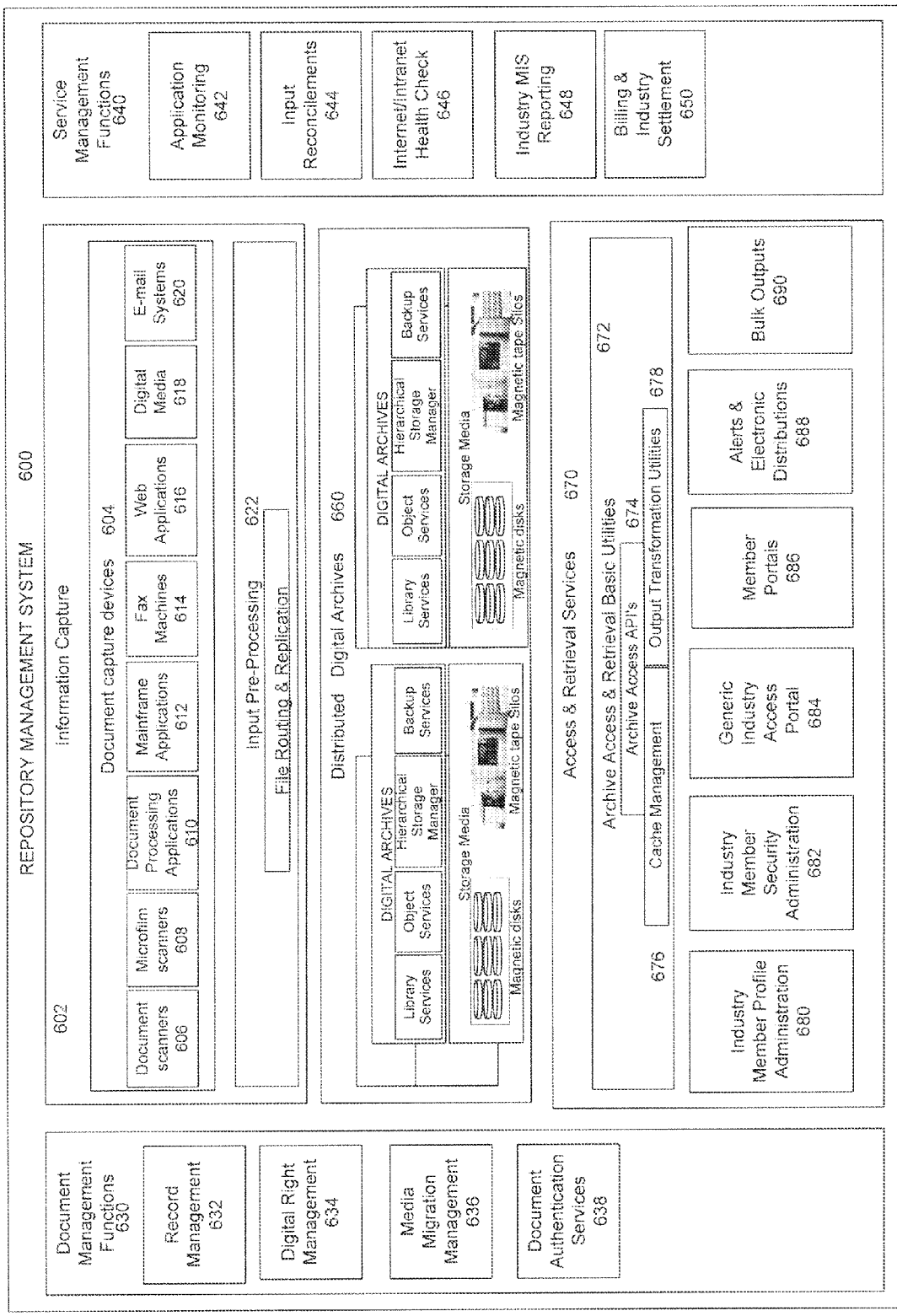
FIG. 6 illustrates a repository management system in accordance with an embodiment of the invention.

FIG. 6 illustrates a repository management system 600 in accordance with an embodiment of the invention. This repository management system 600 may be implemented to manage the virtual industry repositories in combination with the logical data exchange management system described above in FIG. 2B. The two systems may be combined or may be separately implemented. The repository management system 600 may function as a central management system and may perform many functions including security and authentication functions. The repository management system 600 thus may be responsive to the data exchange management system described above and may supplement the functioning of the data exchange management system.

The repository management system 600 may be provided to manage the virtual industry document repositories 520. The repository management 600 may be divided for various functions including information capture 602, input pre-processing 622, document management functions 630, service management functions 640, distributed digital archives 660, and access and retrieval services 670.

The information capture components 602 may include document capture devices 604 such as document scanners 606, microfilm scanners 608, document processing applications 610, mainframe applications 612, fax machines 614, web applications 616, digital media 618, and email systems 620. The input pre-processing components 622 may perform file routing and replication.

The document management components 630 may include a record management component 632, a digital rights or document control management component 634, a media migration management component 636, and a document authentication services component 638.

The service management functions 640 may be performed by an application monitoring component 642, input reconciliation component 644, internet/intranet health check component 646, industry MIS reporting component 648, and billing and industry settlement component 650.

Distributed digital archives components 660 may include library services, object services, a hierarchical storage manager, backup services, and storage media, such as magnetic disks and tapes.

The access and retrieval services 670 may include archive access and retrieval basic utilities 672, such as archive access APIs 674, cache management 676, and output transformation utilities 678. The access and retrieval services 670 may further include industry member profile administration 680, industry member security administration 682, a generic industry access portal 684, member portals 686, alerts and electronic distributions 688, and bulk outputs 690.

Figure 7B:
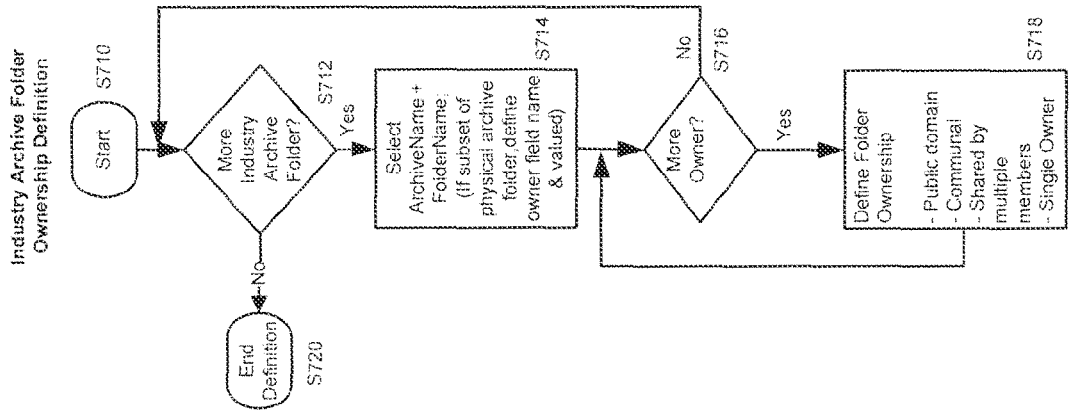
FIG. 7B illustrates a method for defining folder ownership for an industry archive in accordance with an embodiment of the invention.
Figure 7A:
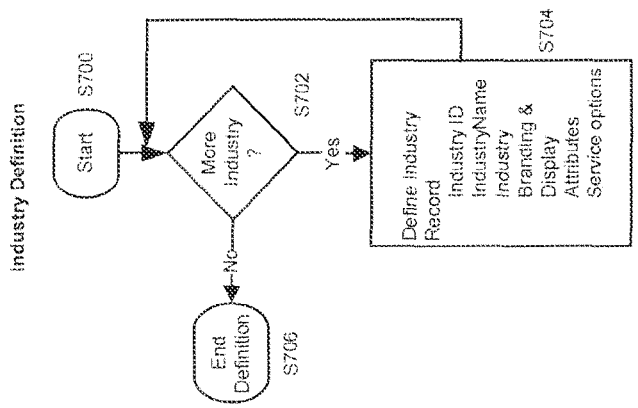
FIG. 7A is a flow chart illustrating a method for defining an industry for a repository in accordance with an embodiment of the invention.

FIG. 7A is a flow chart illustrating a method for defining an industry for a repository in accordance with an embodiment of the invention. The method begins in S700, and the management system determines in S702 if more industries require definition. If more industries require definition in S702, the system defines an industry record in S704. The industry record may be defined through the use of one or more of an industry ID, an industry name, industry branding and display attributes, and service options. The definition method ends in S706.

FIG. 7B illustrates a method for defining folder ownership for an industry archive in accordance with an embodiment of the invention. Participants in system may require separate folders for data segregation. The method begins in S710. In S712, the system determines if more industry archive folders are necessary. If more folders are necessary, in S714, the system selects an archive name and folder name. In S716, the system determines whether additional owners require definition. If additional owners require definition in S716, the system defines folder ownership in S718.

Figure 8A:
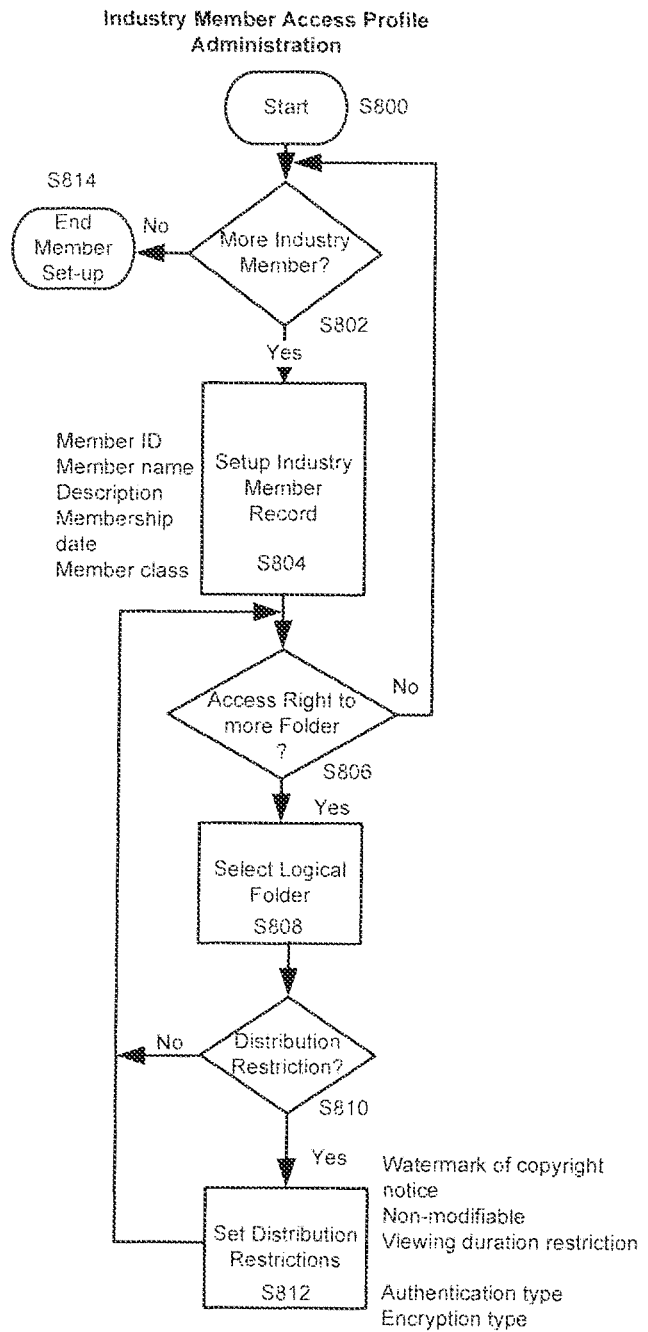
FIG. 8A is a flow chart illustrating a method for setting up industry member access in accordance with an embodiment of the invention.

FIG. 8A is a flow chart illustrating a method for setting up industry member access in accordance with an embodiment of the invention. The method begins in S800 and the system determines if more industry members require set-up in S802. If more industry members require setup, the system sets up an industry member record in S804 In S806, the system determines whether access rights exist to more folders. If access rights exist in S806, the system selects a logical folder in S808. In S810, the system determines if a distribution restriction exists. If such a distribution restriction exists, the system sets the distribution restriction in S812. The distribution restriction may, for example, include a watermark of a copyright notice. The distribution restriction may further include display of a read-only or nonmodifiable version of the data. Distribution restrictions may also include information such as authentication type and encryption type.

Figure 8B:
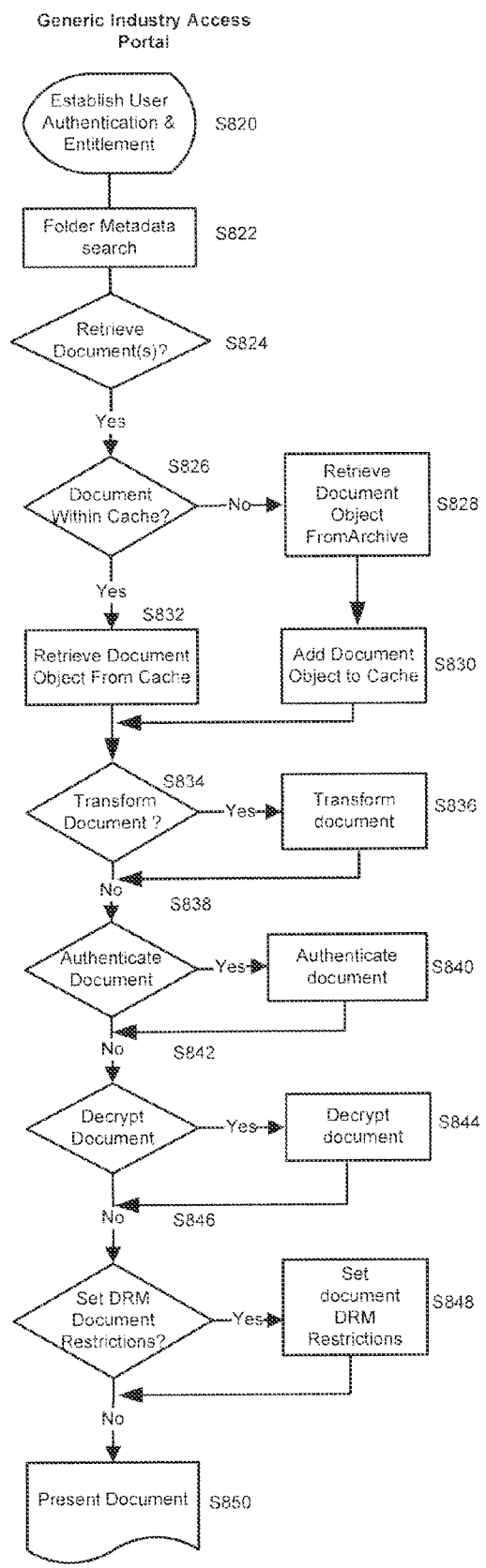
FIG. 8B illustrates a method for retrieving a document from an industry repository in accordance with an embodiment of the invention.

FIG. 8B illustrates a method for retrieving a document from an industry repository in accordance with an embodiment of the invention. The method begins in S820 by establishing user authentication and entitlement. In S822, the system performs a folder metadata search. In S824, the system determines whether document retrieval is required. If such retrieval is required, the system determines in S826 whether the data for retrieval is cached. If the data is not cached in S826, the system retrieves the data from a virtual industry archive in S828 and adds the data object to the cache in S830. If the data is cached as determined in S826, the system retrieves the data object from the cache in S832.

After the document has been retrieved, the system determines in S834 whether to transform the documents. If the document is to be transformed in S834, the system transforms the document in S836. In S838, the system determines whether the document is to be authenticated. If the data is to be authenticated in S838, the system authenticates the document in S840. In S842, the system determines whether the document is to be decrypted in S842. If the document requires decryption, the system decrypts the document in S844. In S846, the system determines whether Digital rights management restrictions are required. If such restrictions are required, the system sets Digital rights management restrictions in S848. Finally, the document is presented in S850.

Thus, a data exchange management system may include a physical data exchange management and a logical data exchange management system. The physical data exchange management system may operate in conjunction with heterogeneous document repositories and the logical data exchange management system may operate in conjunction with an archive management system for virtual industry archives to control the exchange of data between partners. Embodiments of the invention are directed to a data exchange management system for controlling receipt and transmission of documents or other data from a central location. The proposed system manages requestor demands by automating transmission in both directions based on a data exchange profile that contains rules for each requesting customer. The data exchange profile determines necessary operations based on customer rules.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer implemented data exchange management method for managing data exchange between a data storage facility and communicating entities, the data exchange management method comprising:
   receiving a request for data exchange from a communicating entity;
   processing the request by assembling data associated with the request for exchange in accordance with at least data exchange preferences of a relevant data exchange profile for the requesting communicating entity, said processing including,
      processing the request, using computer processing components, through a request handler for handling receipt of data exchange requests from the communicating entities, wherein the request handler accesses the relevant data exchange profile, the request handler handling data exchange request for export of stored data and data exchange requests for import of data for storage in the data storage facility based on at least the data exchange preferences of the relevant data exchange profile;
      formatting data, using the computer processing components, for exchange in accordance with at least the data exchange preferences of the relevant data exchange profile; and
   delivering the formatted data to a destination in accordance with at least the data exchange preferences of the relevant data exchange profile.

2. The method of claim 1, further comprising extracting the requested data from at least one archive.

3. The method of claim 1, wherein the data exchange request is an import request and the destination for delivery is a storage location associated with the data exchange management system.

4. The method of claim 1, wherein formatting data comprises following at least one of encryption rules, digital rights management rules and authentication rules stored in the data exchange profile.

5. The method of claim 1, further comprising transcoding data to ensure compliance with compression guidelines set forth in the data exchange profile.

6. The method of claim 1, further comprising reconciling exchange records and generating exchange reports.

7. The method of claim 1, further comprising providing multiple virtual industry archives, wherein the each of the multiple data repositories stores data for a predetermined industry.

8. A computer implemented data exchange management system for managing data exchange between a data storage facility and communicating entities, the data exchange management system comprising:
   a processor coupled to a memory executing at least a portion of stored executable computer instructions to perform at least the following:
      processing receipt of data exchange requests from the communicating entities; accessing a relevant data exchange profile for a requesting communicating entity;
      processing the data exchange requests for export of stored data and the data exchange requests for import of data for storage in the data storage facility in accordance with at least data exchange preferences of the relevant data exchange profile;
      formatting data, including metadata in accordance with at least the data exchange preferences of the relevant data exchange profile; and
      delivering the data to a destination in accordance with at least the data exchange preferences of the relevant data exchange profile;
   wherein each communicating entity is associated with a stored data exchange profile containing at least the data exchange preferences, said data exchange preferences effecting assembly of data associated with a received data exchange request.

9. The system of claim 8, wherein the data exchange request is an import request and the destination for delivery is a storage location associated with the data exchange management system.

10. The system of claim 8, wherein the data exchange request is an export request and the destination for delivery is an external destination.

11. The system of claim 8, wherein the e processor coupled to the memory further executing at least a portion of the stored executable computer instructions to extract requested data from a data repository.

12. The system of claim 8, wherein the data exchange management system follows encryption rules, digital rights management rules, and authentication rules.

13. The system of claim 8, wherein the processor coupled to the memory further executing at least a portion of the stored executable computer instructions to comply with compression guidelines set forth in the data exchange profile.

14. The system of claim 8, further comprising reconciliation and reporting components for reconciling exchanges in system records generating exchange reports.

15. The system of claim 8, further comprising multiple data repositories.

16. The system of claim 15, further comprising multiple virtual industry archives, wherein the each of the multiple virtual industry archives stores data for a predetermined industry.

17. The system of claim 16, further comprising a logical data exchange management system for managing requests related to storage of data in the virtual industry archives.

18. The method of claim 8, wherein the processor coupled to the memory further executing at least a portion of the stored executable computer instructions to ensure a valid format over time for data stored in the data storage facility.

19. A computer implemented data exchange management system for managing data exchange between data storage facilities and communicating entities, the data exchange management system comprising:
   a logical data exchange management system for managing exchange of data stored in a first designated storage area, the logical data exchange management system comprising,
      a processor coupled to a memory, executing stored executable computer instructions to perform at least the following:
      a request handler for handling processing logical document exchange requests; and an ownership transfer engine for transferring ownership in accordance with the logical document exchange requests; and
   a physical data exchange management system for management of data stored in a second designated storage area, the physical data exchange management system comprising,
      a data exchange profile stored in memory for each communicating entity containing at least data exchange preferences, said data exchange preferences effecting assembly of data associated with a received data exchange request; the processor coupled to the memory executing stored executable computer instructions to perform at least the following:

processing receipt of data exchange requests from the communicating entities;

accessing a relevant stored data exchange profile for a requesting communicating entity;

handling data exchange requests for export of stored data and data exchange requests for import of data for storage in the data storage facility in accordance with at least the data exchange preferences of the relevant data exchange profile;

a formatting engine for formatting data, using computer processing components, in accordance with at least the data exchange preferences of the relevant data exchange profile; and a delivery engine for delivering the data to a destination in accordance with at least the data exchange preferences of the relevant data exchange profile.

20. The system of claim 19, wherein the first designated area comprises virtual industry archives.

21. The system of claim 19, wherein the physical data exchange request is an export request and the destination for delivery is an external destination.

22. The system of claim 19, wherein the data exchange management systems further executes at least a portion of the stored executable computer instructions to for extract requested data from a data repository.

23. The system of claim 19, wherein the physical data exchange request is an import request and the destination for delivery is a storage location associated with the data exchange management system.

24. The system of claim 19, wherein the formatting comprises format metadata as specified in the data exchange profile.

25. The system of claim 19, wherein the formatting follows at least one of encryption rules, digital rights management rules, and authentication rules.

26. The system of claim 19, wherein the data exchange management systems further executes at least a portion of the stored executable computer instructions to comply with compression guidelines set forth in the data exchange profile.

27. The system of claim 19, further comprising activity monitoring components for enabling viewing of data exchange activity.

28. The system of claim 19, further comprising reconciliation and reporting components for reconciling exchanges in system records and generating exchange reports.

* * * * *